United States Patent [19]

Harada et al.

[11] Patent Number: 5,795,629
[45] Date of Patent: Aug. 18, 1998

[54] LIQUID CRYSTAL ALIGNMENT LAYER AND LIQUID CRYSTAL DISPLAY DEVICE

[75] Inventors: Takamasa Harada, Inzai-machi; Hidemasa Yamaguchi, Sayama; Fumie Nozawa, Asaka; Masami Ubukata, Tokorozawa; Haruhiko Itoh, Kakegawa, all of Japan

[73] Assignee: Hoechst Aktiengesellschaft, Frankfurt, Germany

[21] Appl. No.: 615,612

[22] Filed: Mar. 13, 1996

[30] Foreign Application Priority Data

Mar. 15, 1995 [JP] Japan .................................. 7-055983

[51] Int. Cl.$^6$ .................................................. C09K 19/00
[52] U.S. Cl. .................. 428/1; 252/299.01; 349/123; 349/128; 349/136; 349/186; 428/1; 428/156; 428/412; 428/421; 428/423.1; 428/435; 428/473.5; 428/474.4; 428/480
[58] Field of Search .................. 428/1, 447, 412, 428/421, 423.1, 435, 480, 473.5, 156, 474.4; 359/78; 252/299.01; 349/123, 128, 136, 129, 186

[56] References Cited

U.S. PATENT DOCUMENTS

| | | | |
|---|---|---|---|
| 5,237,034 | 8/1993 | Im | 528/26 |
| 5,419,931 | 5/1995 | Asaoka | 428/1 |
| 5,477,360 | 12/1995 | Sunohara | 359/78 |
| 5,486,403 | 1/1996 | Ishitaka | 428/167 |

FOREIGN PATENT DOCUMENTS

| | | |
|---|---|---|
| 0497619 | 8/1992 | European Pat. Off. |
| 0604885 | 7/1994 | European Pat. Off. |

OTHER PUBLICATIONS

Patent Abstracts of Japan, vol. 018, No. 146 (P-1707), Mar. 10, 1994.

Patent Abstracts of Japan, vol. 014, No. 098 (P-1011), Feb. 22, 1990.

Koike et al., "A Full-Color TFT-LCD with a Domain-Divided Twisted-Nematic Structure", *SID 92 Digest*: 798-801 (1992).

Scheffer et al., "Accurate Determination of Liquid-Crystal Tilt Bias Angles", *Journal of Applied Physics* 48(5): 1783-1792 (1977).

Takatori et al., "Splayed TN Configuration Stability in Multi-Domain TN Mode", Display Device Research Laboratory, Functional Devices Research Laboratories, NEC Corporation, pp. 7-12.

Toko et al., "TN-LCDs Fabricated by Non-Rubbing Showing Wide and Homogeneous Viewing Angular Characteristics and Excellent Voltage Holding Ratio", *SID 93 Digest*: 622-625 (1993).

Yang, K.H., "Two-Domain Twisted Nematic and Tilted Homeotropic Liquid Crystal Displays for Active Matrix Applications", *IDRC*: 68-72 (1991).

*Primary Examiner*—Nasser Ahmad
*Attorney, Agent, or Firm*—Frommer Lawrence & Haug LLP

[57] ABSTRACT

A liquid alignment layer characterized by comprising two or more types of polymers wherein a difference between the maximum SP value and the minimum SP value in said polymers being at least 1, and a liquid crystal display device provided with this liquid crystal alignment layer.

20 Claims, No Drawings

LIQUID CRYSTAL ALIGNMENT LAYER AND LIQUID CRYSTAL DISPLAY DEVICE

BACKGROUND OF THE INVENTION

1. Field of the Invention

This invention relates to an alignment layer for a liquid crystal display device and a liquid crystal display device provided with this alignment layer. More particularly, it relates to an alignment layer, by which an alignment state capable of providing a wide viewing angle can be controlled, and a liquid crystal display device using the same.

2. Description of Related Art

A liquid crystal display device is an electro-optical device containing a liquid crystal material which undergoes changes in the optical characteristics when an electrical field is externally applied thereto. In recent years, liquid crystal display devices of the twisted nematic (TN) type have been widely applied to television sets, personal computers, etc., since they are thin and light weight and consume less electricity.

In a liquid crystal display device of the TN type, a liquid crystal alignment layer is formed on-a substrate made of, for example, glass and the surface of the alignment layer is rubbed with a cloth, etc. so as to align liquid crystals, i.e., a so-called rubbing treatment. Namely, a liquid crystal alignment layer is obtained by forming a thin film of a heat-resistant polymer (for example, polyimide, polyamide) by spin coating, printing, dipping, etc. and drying or setting the polymer film followed by rubbing. In such a liquid crystal alignment layer, liquid crystal molecules are aligned in one direction while defining a pretilt angle of usually 2° to 4° from the surface of the substrate. Also, attempts have been made to produce alignment layers by obliquely depositing an organic substance (silicon oxide, etc.) onto a substrate (oblique deposition).

As a basic drawback, however, the characteristics of a liquid crystal display device are highly dependent on the viewing angle. That is to say, it suffers from serious problems including change of the contrast depending upon the viewing angle and black/white inversion of the display.

To overcome this problem in the viewing angle dependency, there have been recently proposed a liquid crystal display device provided with two regions in one pixel, which differ from each other by 180° in the upstanding direction of liquid crystal molecule (K. H. Yang, IDRC, p. 68, 1991, hereby incorporated by reference) and a liquid crystal display device provided with two regions in one pixel, which differ from each other in pretilt angle (Y. Koike, et al., SID, p. 798, 1992, hereby incorporated by reference). In these methods, however, two regions differing in alignment state should be formed in each of fine pixels, which requires photolithographic techniques, etc. Accordingly, such a method involves an elevated number of steps and a complicated process. It is therefore highly difficult to economically produce a liquid crystal display device at a high efficiency thereby. Although there has been proposed amorphous TN alignment which requires no rubbing process (Y. Toko, S. Kobayashi, et al., SID, p. 622, 1993, hereby incorporated by reference), this method suffers from a problem that the whole display has a deteriorated contrast.

Accordingly, it has been urgently required to develop a method for improving the viewing angle dependency by using an alignment layer material, thus solving these problems encountered in the prior art and providing a liquid crystal display device with a less viewing angle dependency.

OBJECTS OF THE INVENTION

Accordingly, it is an object of the present invention to solve the above-mentioned problems by providing a novel liquid crystal alignment layer for producing a liquid crystal display device which has good contrast and less viewing angle dependency, and a liquid crystal display device provided with this alignment layer.

The foregoing and other objects and advantages of the invention will be set forth in or apparent from the following description.

SUMMARY OF THE INVENTION

The present invention provides a liquid crystal alignment layer comprising two or more types of polymers wherein the difference between the maximum SP value and the minimum SP value of said polymers is at least 1. The SP value is a solubility parameter (SP - value $\delta=(\Delta E/V)^{1/2}$ wherein $\delta E$ is the molar heat of vaporization and V is the volume fraction (see, e.g. I. H. Hildebrand, R. L. Scott, The Solubility of Nonelectrolytes, 3rd Ed., Reinhold, N.Y., 1949, hereby incorporated by reference). It is preferable that the liquid crystal alignment layer of the present invention has microprotrusions on the surface thereof. It is still preferable that in the liquid crystal alignment layer of the present invention, at least one of the polymers is a polymer containing siloxane or one containing fluorine.

It is still preferable that the liquid crystal alignment layer of the present invention is capable of forming two or more different alignment states.

By using the liquid crystal alignment layer of the present invention, a liquid crystal display device can be produced which suffers from no inversion and has a good contrast and less viewing angle dependency of the display characteristics.

The present invention further provides a liquid crystal display device having a liquid crystal material put between a pair of substrates each comprising a transparent electrode and an alignment layer formed thereon in such a manner that the alignment layers are arranged inside so as to face each other, characterized in that the alignment layer of the present invention is used as at least one side of the alignment layers.

DESCRIPTION OF THE PREFERRED EMBODIMENTS

The term "two or more different alignment states of the liquid crystal" formed by the alignment layer of the present invention means, for example, that there are two regions in the liquid crystal display device where the twist direction of the liquid crystal molecule is clockwise or anticlockwise, and that a splayed alignment state or two or more liquid crystal alignment states, which are different in direction of the pretilt angle of the liquid crystal molecule, are present.

For example, when two different liquid crystal alignment regions, the twist directions of the liquid crystal molecules thereof are clockwise and anticlockwise, are formed by an aligning processing in one direction, the viewing characteristics of these two alignment regions are shifted by 90° to each other in each direction. In this liquid crystal display device, therefore, the viewing angle characteristics is widened, compared with existing liquid crystal display devices of TN type having a single twist direction.

When two splayed alignment regions, which are shifted by 1800° to each other in the upstanding direction of liquid crystal molecule upon application of a voltage, are formed, the viewing angle characteristics of these two alignment regions are shifted in a direction of 1800°. As a result, the viewing angle characteristics is widened, compared with existing liquid crystal display devices of TN type having a single twist and upstanding direction. When a further region is formed wherein the twist directions of the liquid crystal molecules is opposite to the direction of splayed alignment, there are formed three or four regions. The viewing angle characteristics of these regions overlap each other, which further widens the viewing angle characteristics. A different splayed alignment region, wherein the upstanding direction of liquid crystal molecule is shifted to 180°, is formed when more than one regions are formed, wherein the pretilt angle of the upper substrate is larger than that of the lower substrate in one region, and the pretilt angle of the lower substrate is larger than that of the upper substrate in other regions.

Furthermore, when two or more regions differing in the pretilt angle of liquid crystal molecule are formed by an aligning processing in one direction, the viewing angle characteristics of these regions overlap each other and thus the viewing angle characteristics are widened.

It is believed that such two or more different liquid crystal alignment states can be established by, for example, blending at least two different types of polymers, the difference between the maximum SP value and the minimum SP value of which is at least 1, in accordance with the present invention so as to induce phase separation on the surface of the alignment layer.

It is preferable that the alignment layer of the present invention has microprotrusions with arbitrary sizes and shapes on the surface thereof. These microprotrusions are from several hundred Å to several μm in size, i.e., in diameter, and from several hundred Å to several μm in height, preferably from several hundred Å to several thousand Å in height. Size and height of the microprotrusions can be measured by methods well known in the art, e.g., atomic force microscopy or scanning electron microscopy. When at least one polymer, which differs in SP value by i or more from other polymers, serves as a base material amounting to 50% or more of the alignment layer materials while other polymer(s) are used as so-called dopant(s) to be blended with the base, a phase separation is generated by mixing these polymers. As a result, it is believed that the polymer(s) added form microphase separation structures on the base polymer, thus giving microprotrusions.

The alignment layer of the present invention can be produced by mixing two or more polymers differing in SP value by at least 1, and forming a film of the resulting mixture on a glass or plastic substrate by spin coating or print coating in accordance with a method commonly known in the art. By forming such alignment layers on both substrates, a liquid crystal display device having two or more alignment states with a high stability and a good reproducibility can be established.

The polymers to be used as the material for the alignment layer of the present invention can be selected from, but are not limited to, those commonly employed in organic alignment layers such as polyimide, polyamide, polyurethane, polyester, polycarbonate, polyurea, polyether, polyimidoamide, polypeptide, polyolefins, cellulose and derivatives thereof, polyacrylates, polymethacrylates, polyvinyl such as polystyrenes and polyvinyl alcohol. It is preferable that at least one of the polymers to be used as the material for the alignment layer of the present invention is a polymer containing siloxane or one containing fluorine.

Polyimide, polyamide, polyurethane, polyester, polycarbonate, polyether, polyimidoamide and polyurea can be obtained by polymerizing monomers (for example, diisocyanate, diol, dicarboxylic acid, diamine, tetracarboxylic anhydride) by a method which has been commonly known by those skilled in the art.

A polymer containing fluorine can be obtained by using a monomer substituted with fluorine atom(s).

Examples of cellulose and derivatives thereof include hydroxypropyl cellulose, cellulose, hydroxymethyl cellulose, cellulose acetate butyrate, cellulose acetate phthalate, cellulose triacetate, methyl cellulose, cellulose acetate, cellulose hydroxypeptide, p-aminobenzyl cellulose, polyethyleneimine cellulose, triethylaminoethyl cellulose, ethyl cellulose, cyanoethylated cellulose, carboxymethylated cellulose, diethylaminohydroxypropylated cellulose, sulfohydroxypropylated cellulose, trimethylaminohydroxypropylated cellulose and bromoacetyl cellulose.

Examples of polyvinyl and derivatives thereof include polystyrene, sodium poly-4-styrene sulfonate, polymethylstyrene, dicarboxy- terminated polystyrene, monocarboxy-terminated polystyrene, polystyrene divinylbenzene, polystyrene methyl methacrylate, 3-trifluoromethylstyrene, polyvinylalcohol, polyvinylbiphenyl, polyvinylbiphenylether, polyvinylcinnamate, polyvinylformal, polyacenaphthylene, polyvinylcarbazole, polyvinylcyclohexyl, polyvinylmethlketone, polyvinylnaphthalene, polyvinylphenol, polyvinylpyridine, polyvinylbutyral, polyvinylidenefluoride, polyvinylpyridine-N-oxide, polyvinylchloride, polyvinylfluoride and polystyrenesulfonylfluoride.

Examples of the polyacrylates or polymethacrylates include poly(methyl acrylate), poly(methyl methacrylate), poly(ethyl acrylate), poly(ethyl methacrylate), poly(butyl acrylate), poly(butyl methacrylate), poly(isobutyl acrylate), poly(isobutyl methacrylate), poly(t-butyl acrylate), poly(t-butyl methacrylate), poly(hexyl acrylate), poly(hexyl methacrylate), poly(2-ethylbutyl acrylate), poly(2-ethylbutyl methacrylate), poly(benzyl acrylate), poly(benzyl methacrylate), poly(cyclohexyl acrylate), poly(cyclohexyl methacrylate), poly(norbornyl acrylate), poly(norbornyl methacrylate), poly(isobornyl acrylate), poly(isobornyl methacrylate), poly(biphenyl acrylate), poly(biphenyl methacrylate) and copolymers thereof.

A fluorine-containing polymer can be obtained by introducing fluorine atom(s) into such a polyacrylate or a polymethacrylate.

As the polyolefins, use can be made of, for example, polyethylene, polypropylene, polyacetylene, polybutadiene, polyvinylidene fluoride and copolymers thereof. In addition thereto, polysilastyrene, etc. are also usable therefor.

As a siloxane-containing polymer, use can be made of polymers obtained by reacting a compound represented by the following general formula as a siloxane component. It is preferable to use a block polymer of siloxane with other polymer(s).

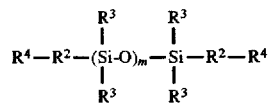

wherein m is an integer of 1 or above;

$R^2$ represents a divalent hydrocarbon group;

$R^3$ represents a monovalent, linear or branched, aliphatic hydrocarbon group having from 1 to 5 carbon atoms or a alicyclic or aromatic hydrocarbon group having from 4 to 14 carbon atoms; and $R^4$ represents —$NH_2$, —OH, —COOH, $Ar(COOH)_2$, $Ar(CO)_2O$ or —$NHSi(CH_3)_3$, wherein Ar represents an aromatic group.

It is preferable that $R^2$ is a linear alkylene group having from 1 to 10 carbon atoms. Ar is preferably an aromatic group having from 4 to 14 carbon atoms.

Examples of the aliphatic hydrocarbon group usable as $R^3$ include methyl, ethyl, propyl, isopropyl, n-butyl, t-butyl and pentyl groups. Examples of the alicyclic hydrocarbon group include cyclopropyl, cyclobutyl, cyclopentyl and cyclohexyl groups. Examples of the aromatic hydrocarbon group include phenyl, tolyl, xylyl, biphenyl, naphthyl, anthryl and phenanthryl groups. These aromatic rings may be substituted by, for example, halogen atoms, nitro groups or alkyl groups. $R^3$ may be different from each other. It is preferable that $R^3$ is a methyl group.

In the above formula, it is preferable that m is 2 or above, still preferably 8 or above. When the polymerization degree of polysiloxane is excessively high, however, there arises a tendency toward deterioration in the strength of the alignment layer material. It is therefore preferable that m is not more than 100.

EXAMPLES

To further illustrate the present invention in greater detail, and not by way of limitation, the following Examples will be given.

Example 1

Polymer 1 (PAS; m=1 0, SP value=13.1) represented by the following formula:

Example 2

Polymer 1 (PAS) employed in Example 1 and Polymer 3 (poly(cyclohexyl methacrylate), SP value=9.4) at a mixing ratio of 10:1 were dissolved in a solvent (N-methylpyrrolidone) to give a solution of 3% by weight in concentration. The resulting solution was applied by using a spinner onto a glass substrate provided with a transparent electrode and then heated to 200° C. for 1 hour to give a film of the mixture. The film thus obtained was about 50 nm in thickness. When observed under an atomic force microscope, the surface of the film showed protrusions of about 50 nm in height and about 600 nm in diameter. This film was rubbed in one direction with a nylon cloth. Then one substrate was laid on top of another while putting a spacer (5 μm) between them in such a manner as to adjust the angle of the rubbing directions to 90° followed by sealing. Next, nematic liquid crystal (LIXON 5043XX, Chisso co.) was filled into the space between the substrates to form a liquid crystal cell. Observation of the liquid crystal alignment state thereof indicated that there were four liquid crystal alignment regions differing in viewing characteristics from each other. By referring the angles transverse and vertical to the front surface of the cell respectively to as 0° and 90°, display characteristics at 45° and 90° were compared in contrast. As a result, no difference in the contrast was observed therein, which proved that the viewing angle was widened.

Example 3

Polymer 1 (PAS) employed in Example 1 and Polymer 4 (polysilastyrene, SP value=11.1) at a mixing ratio of 10:1

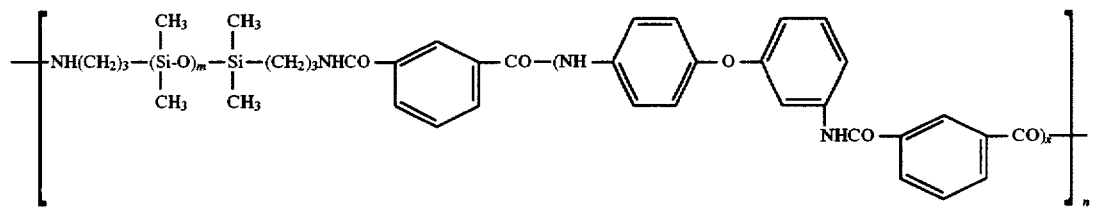

and polymer 2 (ethylhydroxyethyl cellulose, SP value=9.3) at a mixing ratio of 10:1 were dissolved in a solvent (N-methylpyrrolidone) to give a solution of 3% by weight in concentration. The resulting solution was applied by using a spinner onto a glass substrate provided with a transparent electrode and then heated to 200° C. for 1 hour to give a film of the mixture. The film thus obtained was about 50 nm in thickness. When observed under an atomic force microscope, the surface of the film showed protrusions of about 50 nm in height and about 2,000 nm in diameter. This film was rubbed in one direction with a nylon cloth. Then one substrate was laid on top of another while putting a spacer (5 μm) between them in such a manner as to adjust the angle of the rubbing directions to 90° followed by sealing. Next, a nematic liquid crystal (LIXON 5043XX, Chisso co.) was filled into the space between the substrates to form a liquid crystal cell. Observation of the liquid crystal alignment state thereof indicated that there were four liquid crystal alignment regions differing in viewing characteristics from each other. By referring the angles transverse and vertical to the front surface of the cell respectively to as 0° and 90°, display characteristics at 45° and 90° were compared in contrast. As a result, no difference in the contrast was observed therein, which proved that the viewing angle was widened.

were dissolved in a solvent (N-methylpyrrolidone) to give a solution of 3% by weight in concentration. The resulting solution was applied by using a spinner onto a glass substrate provided with a transparent electrode and then heated to 200° C. for 1 hour to give a film of the mixture. The film thus obtained was about 50 nm in thickness. When observed under an atomic force microscope, the surface of the film showed protrusions of about 30 nm in height and about 100 nm in diameter. This film was rubbed in one direction with a nylon cloth. Then one substrate was laid on top of another while putting a spacer (5 μm) between them in such a manner as to adjust the angle of the rubbing directions to 90° followed by sealing. Next, a nematic liquid crystal (LIXON 5043XX, Chisso co.) was filled into the space between the substrates to form a liquid crystal cell. Observation of the liquid crystal alignment state thereof indicated that there were four liquid crystal alignment regions differing in viewing characteristics from each other. By referring the angles transverse and vertical to the front surface of the cell respectively to as 0° and 90°, display characteristics at 45° and 90° were compared in contrast. As a result, no difference in the contrast was observed therein, which proved that the viewing angle was widened.

Example 4

Polymer 1 (PAS) employed in Example 1 and Polymer 5 (poly(isobornyl methacrylate), SP value=7.7) at a mixing ratio of 10:1 were dissolved in a solvent (N-methylpyrrolidone) to give a solution of 3% by weight in concentration. The resulting solution was applied by using a spinner onto a glass substrate provided with a transparent electrode and then heated to 200° C. for 1 hour to give a film of the mixture. The film thus obtained was about 50 nm in thickness. When observed under an atomic force microscope, the surface of the film showed protrusions of about 30 nm in height and about 50 nm in diameter. This film was rubbed in one direction with a nylon cloth. Then one substrate was laid on top of another while putting a spacer (5 µm) between them in such a manner as to adjust the angle of the rubbing directions to 90° followed by sealing. Next, a nematic liquid crystal (LIXON 5043XX, Chisso co.) was -tilled into the space between the substrates to form a liquid crystal cell. Observation of the liquid crystal alignment state thereof indicated that there were four liquid crystal alignment regions differing in viewing characteristics from each other. By referring the angles transverse and vertical to the front surface of the cell respectively to as 0° and 90°, display characteristics at 45° and 90° were compared in contrast. As a result, no difference in the contrast was observed therein, which proved that the viewing angle was widened.

Example 5

Polymer 1 (PAS) employed in Example I and Polymer 6 (poly(4-vinylbiphenyl), SP value=11.8) at a mixing ratio of 10:1 were dissolved in a solvent (N- methylpyrrolidone) to give a solution of 3% by weight in concentration. The resulting solution was applied by using a spinner onto a glass substrate provided with a transparent electrode and then heated to 200° C. for 1 hour to give a film of the mixture. The film thus obtained was about 50 nm in thickness. When observed under an atomic force microscope, the surface of the film showed protrusions of about 30 nm in height and about 50 nm in diameter. This film was rubbed in one direction with a nylon cloth. Then one substrate was laid on top of another while putting a spacer (5 µm) between them in such a manner as to adjust the angle of the rubbing directions to 90° followed by sealing. Next, a nematic liquid crystal (LIXON 5043XX, Chisso co.) was filled into the space between the substrates to form a liquid crystal cell. Observation of the liquid crystal alignment state thereof indicated that there were four liquid crystal alignment regions differing in viewing characteristics from each other. By referring the angles transverse and vertical to the front surface of the cell respectively to as 0° and 90°, display characteristics at 45° and 90° were compared in contrast. As a result, no difference in the contrast was observed therein, which proved that the viewing angle was widened.

Example 6

Polymer 1 (PAS) employed in Example 1 and Polymer 7 (polyethylene, SP value =8.0) at a mixing ratio of 10:1 were dissolved in a mixed solvent of N-methylpyrrolidone and butylcellosolve to give a solution of 3% by weight in concentration. The resulting solution was applied by using a spinner onto a glass substrate provided with a transparent electrode and then heated to 200° C. for 1 hour to give a film of the mixture. The film thus obtained was about 50 nm in thickness. When observed under an atomic force microscope, the surface of the film showed protrusions of about 30 nm in height and about 100 nm in diameter. This film was rubbed in one direction with a nylon cloth. Then one substrate was laid on top of another while putting a spacer (5 µm) between them in such a manner as to adjust the angle of the rubbing directions to 90° followed by sealing. Next, a nematic liquid crystal (LIXON 5043XX, Chisso co.) was filled into the space between the substrates to form a liquid crystal cell.

Observation of the liquid crystal alignment state thereof indicated that there 5 were four liquid crystal alignment regions differing in viewing characteristics from each other. By referring the angles transverse and vertical to the front surface of the cell respectively to as 0° and 90°, display characteristics at 45° and 90° were compared in contrast. As a result, no difference in the contrast was observed therein, which proved that the viewing angle was widened.

Example 7

Polymer 8 (SP value=10.5) represented by the following formula (2):

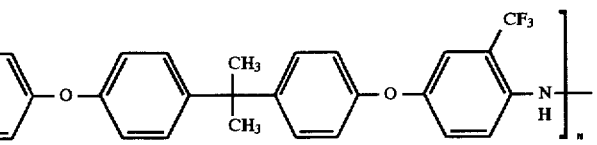

and Polymer 9 (poly(cyclohexyl methacrylate), SP value= 9.4) at a mixing ratio of 10:1 were dissolved in a solvent (N-methylpyrrolidone) to give a solution of 3% by weight in concentration. The resulting solution was applied by using a spinner onto a glass substrate provided with a transparent electrode and then heated to 200° C. for 1 hour to give a film of the mixture. The film 25 thus obtained was about 50 nm in thickness. When observed under an atomic force microscope, the surface of the film showed protrusions of about 50 nm in height and about 1,000 nm in diameter. This film was rubbed in one direction with a nylon cloth. Then one substrate was laid on top of another while putting a spacer (5 µm) between them in such a manner as to adjust the angle of the rubbing directions to 90° followed by sealing. Next, a nematic liquid crystal (LIXON 5043XX, Chisso co.) was filled into the space between the substrates to form a liquid crystal cell. Observation of the liquid crystal alignment state thereof indicated that there were four liquid crystal alignment regions differing in viewing characteristics from each other. By referring the angles transverse and vertical to the front surface of the cell respectively to as 0° and 90°, display characteristics at 45° and 90° were compared in contrast. As a result, no difference in the contrast was observed therein, which proved that the viewing angle was widened.

Comparative Example 1

Polymer 1 (PAS) employed in Example 1 and Polymer 9 (polyaramide, SP value =13.5) at a mixing ratio of 10 1 were dissolved in a solvent (N-methylpyrrolidone) to give a solution of 3% by weight in concentration. The resulting solution was applied by using a spinner onto a glass substrate provided with a transparent electrode and then heated to 200° C. for 1 hour to give a film of the mixture. The film thus obtained was about 50 nm in thickness. When observed under an atomic force microscope, the surface of the film showed no protrusions. This film was rubbed in one direction with a nylon cloth. Then one substrate was laid on top of another while putting a spacer (5 μm) between them in such a manner as to adjust the angle of the rubbing directions to 90° followed by sealing. Next, a nematic liquid crystal (LIXON 5043XX, Chisso co.) was filled into the space between the substrates to form a liquid crystal cell. Observation of the liquid crystal alignment state thereof indicated that there was no alignment region differing in viewing characteristics. By referring, the angles transverse and vertical to the front surface of the cell respectively to as 0° and 90°, display characteristics at 45° and 90° were compared in contrast. As a result, inversion phenomena occurred in both of these contrasts and the viewing angle was not widened.

Comparative Example 2

Polymer 1 (PAS) employed in Example 1 and Polymer 10 (PAS, SP value=13.1) represented by the above formula (1), wherein m was 21, at a mixing ratio of 10:1 were dissolved in a solvent (N-methylpyrrolidone) to give a solution of 3% by weight in concentration. The resulting solution was applied by using a spinner onto a glass substrate provided with a transparent electrode and then heated to 200° C. for 1 hour to give a film of the mixture. The film thus obtained was about 50 nm in thickness. When observed under an atomic force microscope, the surface of the film showed no protrusions. This film was rubbed in one direction with a nylon cloth. Then one substrate was laid on top of another while putting a spacer (5 μm) between them in such a manner as to adjust the angle of the rubbing directions to 90° followed by sealing. Next, a nematic liquid crystal (LIXON 5043XX, Chisso co.) was filled into the space between the substrates to form a liquid crystal cell. Observation of the liquid crystal alignment state thereof indicated that there was no alignment region differing in viewing characteristics. By referring the angles transverse and vertical to the front surface of the cell respectively to as 0° and 90°, display characteristics at 45° and 90° were compared in contrast. As a result, inversion phenomena occurred in both of these contrasts and the viewing angle was not widened.

Comparative Example 3

Polymer 8 (formula (2), SP value=10.5) employed in Example 7 was dissolved in a solvent (N-methylpyrrolidone) to give a solution of 3% by weight in concentration. The resulting solution was applied by using a spinner onto a glass substrate provided with a transparent electrode and then heated to 200° C. for 1 hour to give a film of the mixture. The film thus obtained was about 50 nm in thickness. When observed under an atomic force microscope, the surface of the film showed no protrusions. This film was rubbed in one direction with a nylon cloth. Then one substrate was laid on top of another while putting a spacer (5 μm) between them in such a manner as to adjust the angle of the rubbing directions to 90° followed by sealing. Next, a nematic liquid crystal (LIXON 5043XX, Chisso co.) was filled into the space between the substrates to form a liquid crystal cell. Observation of the liquid crystal alignment state thereof indicated that there was no alignment region differing in viewing characteristics. By referring the angles transverse and vertical to the front surface of the cell respectively to as 0° and 90°, display characteristics at 45° and 90° were compared in contrast. As a result, inversion phenomena occurred in both of these contrasts and the viewing angle was not widened.

Comparative Example 4

OPTOMER AL1051, a commercially available alignment layer produced by Japan Synthetic Rubber Co., Ltd., was applied by using a spinner onto a glass substrate provided with a transparent electrode and then heated to 200° C. for 1 hour to give a film of the mixture. The film thus obtained was about 50 nm in thickness. When observed under an atomic force microscope, the surface of the film showed no protrusions. This film was rubbed in one direction with a nylon cloth. Then one substrate was laid on top of another while putting a spacer (5 μm) between them in such a manner as to adjust the angle of the rubbing directions to 90 followed by sealing. Next, a nematic liquid crystal (LIXON 5043XX, Chisso co.,) was filled into the space between the substrates to form a liquid crystal cell. Observation of the liquid crystal alignment state thereof indicated that there was no alignment region differing in viewing characteristics. By referring the angles transverse and vertical to the front surface of the cell respectively to as 0° and 90°, display characteristics at 45° and 90° were compared in contrast. As a result, inversion phenomena occurred in both of these contrasts and the viewing angle was not widened.

The above description of the invention is intended to be illustrative and not limiting. Various changes or modifications in the embodiments described may occur to those skilled in the art. These can be made without departing from the spirit or scope of the invention.

We claim:

1. A liquid crystal alignment layer for nematic liquid crystals comprising two or more kinds of polymers wherein the difference between the maximum SP value and the minimum SP value of said polymers is at least 1.

2. A liquid crystal alignment layer for nematic liquid crystals as claimed in claim 1, wherein said liquid crystal alignment layer further comprises microprotrusions on the surface thereof.

3. A liquid crystal alignment layer for nematic liquid crystals as claimed in claim 1, wherein at least one of said polymers is a polymer containing siloxane or a polymer containing fluorine.

4. A liquid crystal alignment layer for nematic liquid crystals as claimed in claim 1, wherein said liquid crystal alignment layer is capable of forming two or more different alignment states.

5. A liquid crystal alignment layer for nematic liquid crystals as claimed in claim 2, wherein said liquid crystal alignment layer is capable of forming two or more different alignment states.

6. A liquid crystal alignment layer for nematic liquid crystals as claimed in claim 3, wherein said liquid crystal alignment layer is capable of forming two or more different alignment states.

7. A nematic liquid crystal display device comprising a nematic liquid crystal material between a pair of substrates, each substrate comprising a transparent electrode and an alignment layer for nematic liquid crystals formed thereon in such a manner that the alignment layers are arranged inside so as to face each other, wherein at least one of said alignment layers is an alignment layer as claimed in claim 1.

8. A liquid crystal alignment layer for nematic liquid crystals as claimed in claim 2, wherein said microprotrusions have a size from 500 angstroms to 10 microns and a height from 500 angstroms to 10 microns.

9. A liquid crystal alignment layer for nematic liquid crystals as claimed in claim 2, wherein said polymers include at least one dopant polymer blended with at least one base polymer material, wherein said base polymer material amounts to at least 50% of the liquid crystal alignment layer and has a SP value that differs by 1 or more from said dopant polymers in said alignment layer.

10. A liquid crystal alignment layer for nematic liquid crystals as claimed in claim 9, wherein said dopant polymers are blended with said base polymer material to result in a phase separation.

11. A liquid crystal alignment layer for nematic liquid crystals as claimed in claim 1, wherein at least one of said polymers is selected from the group consisting of polyimide, polyamide, polyurethane, polyester, polycarbonate, polyurea, polyether, polyimidoamide, polypeptide, polyolefins, cellulose and derivatives thereof, polyacrylates, polymethacrylates and polyvinyl.

12. A liquid crystal alignment layer for nematic liquid crystals as claimed in claim 1, wherein at least one of said polymers is a block polymer of siloxane of the formula:

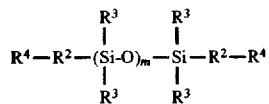

wherein m is an integer of 1 or above;

$R^2$ represents a divalent hydrocarbon group;

$R^3$ represents a monovalent, linear or branched, aliphatic hydrocarbon group having from 1 to 5 carbon atoms or an alicyclic or aromatic hydrocarbon group having from 4 to 14 carbon atoms; and $R^4$ represents —$NH_2$, —OH, —COOH, Ar(COOH)$_2$, Ar(CO)$_2$O or —NHSi(CH$_3$)$_3$, wherein Ar represents an aromatic group.

13. An alignment layer for nematic liquid crystals as claimed in claim 12, wherein $R^2$ is a linear alkylene group having from 1 to 10 carbon atoms.

14. An alignment layer for nematic liquid crystals as claimed in claim 12, wherein Ar is an aromatic group having from 4 to 14 carbons.

15. An alignment layer for nematic liquid crystals as claimed in claim 12, wherein $R^3$ is an aliphatic hydrocarbon group selected from the group consisting of methyl, ethyl, propyl, isopropyl, n-butyl, t-butyl and pentyl.

16. An alignment layer for nematic liquid crystals as claimed in claim 12, wherein $R^3$ is a methyl group.

17. An alignment layer for nematic liquid crystals as recited in claim 12, wherein m is at least 2.

18. An alignment layer for nematic liquid crystals as recited in claim 12, wherein m is at least 8.

19. An alignment layer for nematic liquid crystals as recited in claim 12, wherein m ranges from 2 to 100.

20. An alignment layer for nematic liquid crystals as recited in claim 1, wherein said layer comprises a base polymer material in an amount greater than 50%.

* * * * *